E. K. BAKER.
WHEEL RIM FOR PNEUMATIC TIRES.
APPLICATION FILED OCT. 21, 1905.
1,053,346.
Patented Feb. 18, 1913.
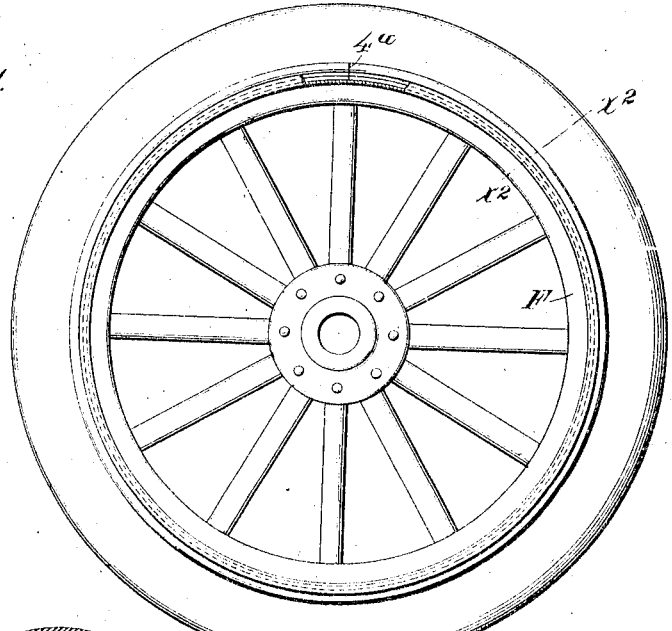
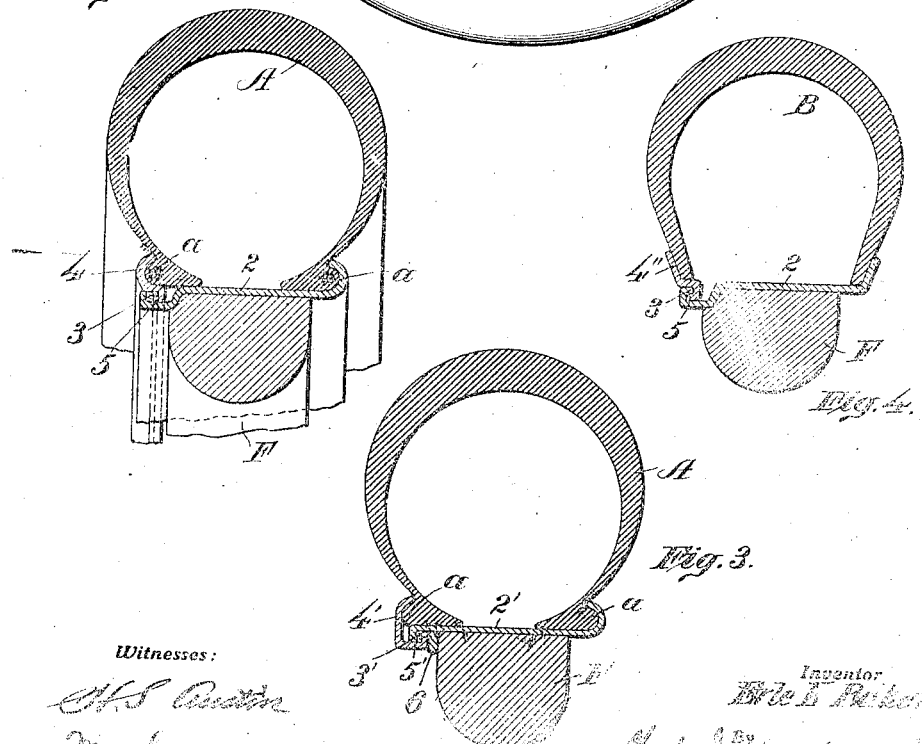
Witnesses:
Inventor

UNITED STATES PATENT OFFICE.

ERLE K. BAKER, OF CHICAGO, ILLINOIS, ASSIGNOR, BY DIRECT AND MESNE ASSIGNMENTS, TO UNIVERSAL RIM COMPANY, OF CHICAGO, ILLINOIS, A CORPORATION OF ILLINOIS.

WHEEL-RIM FOR PNEUMATIC TIRES.

1,053,346.  Specification of Letters Patent.  Patented Feb. 18, 1913.

Application filed October 21, 1905. Serial No. 283,797.

*To all whom it may concern:*

Be it known that I, ERLE K. BAKER, residing at Chicago, in the county of Cook and State of Illinois, have invented a certain new, useful, and Improved Wheel-Rim for Pneumatic Tires, of which the following is a full, clear, and exact description, such as will enable others skilled in the art to which it appertains to make and use the same.

My invention relates to improvements in wheel rims and has special reference to improvements in rims for wheels which are provided with pneumatic or cushion tires. With few exceptions the rims hitherto used with such tires have been of solid formation, having fixed flanges, to retain the base of the tire. It is well known that it is difficult to either place a tire upon or remove it from such a rim. The expenditure of much time and effort is always required in doing this work, and not infrequently a tire is injured by the stretching to which it is subjected when being forced over the rim flange. Another objection to the common construction of rims and tires is that the tire must be and is made considerably larger than the body of the rim. Otherwise the tire which is practically inelastic at its inner edges could not be passed over the flanges of the rim. The difference in the sizes of the rim and the tire makes it difficult to bind the tire securely on the rim and sometimes results in allowing the tire to slip, all of which tends to shorten the life of the tire. The desirable features and advantages which are sought to be obtained are, a snug fit between the tire and the body of the rim:—a firm fastening for the tire and ease of removal.

The particular objects of my invention are to provide a wheel rim which shall comprise two or more parts that may be readily separated so that a snugly fitting tire may be easily placed upon or removed from the rim;—to provide a rim having one or both flanges removable and of such form and arrangement that a tire may be placed on the rim by hand without using special tools;—to provide a wheel rim which shall have a separable flange that may be both attached and detached without the use of tools; to provide a wheel rim that shall be of neat appearance, comparatively light weight, and of little cost; and, also to provide a two-part wheel rim, the parts of which, though readily separable, shall be normally so firmly joined as to be equal to a solid rim in strength.

A further and special object of my invention is to provide a wheel rim of the class mentioned which shall have one or more separable flanges, so connected with the rim proper as to be interchangeable with flanges of different cross-sectional shapes, a special purpose of my invention being to provide a wheel rim that may be used with or adapted to any of the several kinds of tires in common use.

With the foregoing objects in view, my invention consists generally in a wheel rim composed of metal and provided with a detachable tire-holding flange or flanges, which, being removed, permit the easy placement or removal of a tire.

Further, my invention consists in a wheel rim and its flange, formed separately and having interlocking portions which adapt the flange to be placed upon the rim and to be there locked in the position of the ordinary flange while permitting the same to be easily disengaged from the rim when necessary.

Further and more specifically defined, my invention consists in a peculiarly flanged endless wheel rim, in combination with a split or open rim flange in the form of a ring, having an annular hook portion and adapted to interlock with the flange on said rim in such manner that the expansive force of a tire will act to effectually secure or lock the flange on the rim, to be disengaged therefrom only when the tire is deflated. And further my invention consists in various details of construction and in combinations of parts, all as hereinafter described and particularly pointed out in the claims.

The invention will be more readily understood by reference to the accompanying drawings, forming a part of this specification, and in which—

Figure 1 is a side view of an automobile wheel equipped with a rim embodying my invention; Fig. 2 is an enlarged cross section thereof on the line $x^2$—$x^2$ of Fig. 1; Fig. 3 is a similar view illustrating my invention in modified form; and Fig. 4 illustrates a still further modification of the invention.

The essential features of my invention, as shown in the drawings, are, first, the annular rim, 2, having an inwardly turned interlocking flange, 3, and, second, a split ring, 4, which takes the place of the usual rim flange, and has an outwardly turned interlocking flange, 5, to engage with the flange, 3, on the rim. As exhibited in the drawings (see Figs. 2 and 3), the flange, 3, of the rim, may be formed on either the outer side or the inner side of the rim, the split ring, 4, being made to correspond. Viewed in cross-section, the interlocking flanges of the rim and the ring may be in any desired plane or relative position adjacent to the main body of the rim—that is, the cylindrical portion. As stated, the ring, 4, is split—in other words, opened at a point, 4ª, so that the ends of the ring may be either separated or drawn together as required to place it upon and remove it from the rim. The two parts are engaged and disengaged by the movement of the ring laterally on the rim. This may be done when there is no tire on the rim or when a tire has been deflated, but it will be evident that when the tire has been positioned on the rim and has been expanded, its outward pressure against the interlocked flange ring will hold the latter firmly in place on the rim. The detachable flange or ring may be of any desired form in cross section; in short, it takes its form from the disposition of the interlocking flange on the rim, and the shape of the side of the tire which it is designed to hold. This is clearly illustrated in Figs. 2, 3 and 4 of the drawings, wherein the rings, 4, 4' and 4'', are of the different shapes necessitated by the variation in the factors above mentioned. In the first case the flange ring is set upon the outside of the rim and is curved to correspond to the curved bead, *a*, at the base of the tire, A, the tire being of the common clencher type. The ring, 4', of Fig. 3, is also made to fit a clencher tire, but is set against the inner side or face of the rim, 2, its cross-sectional shape being correspondingly varied. The flange ring, 4'', of Fig. 4, is substantially identical with the ring of Fig. 2, except that its outer portion is slightly flared and is straight in cross-section, as required to fit the straight edged base of the tire, B. It is obvious that I may make both flanges of this wheel rim in the manner above described, but it is usually sufficient to have only the outer flange of the rim made in this way; hence, I generally make the inner flange, *i. e.*, the flange on the inner side of the wheel integral with the body of the rim and of a shape corresponding to the tire to be used.

An advantage attaching to the structure shown in Fig. 3, is that the interlocking flange lies entirely within the outer circumference of the rim, so that the latter presents the form of a simple cylinder when the ring, 4', is removed. This being the case, the rim, 2', is adapted to receive a tire of exactly its own size. I secure the same advantage in the case of the rim of Figs. 2 and 4, by swaging the edge inwardly so that the interlocking flange, 3, of the rim may be of less circumference than the body of the rim. Thus formed, the interlocking flange in no way interferes with the placing and removal of the tire. The wheel felly, F, may be of any suitable form and the rim is secured thereto in any suitable manner; the only variation from the conventional shape of the felly is in the case of the swaged rim of Figs. 2 and 4 where the shoulder of the rim is accommodated in the felly.

My wheel rim is preferably made of two parts, the rim proper and the detachable flange or ring, but it is obvious that either of these parts may comprise two or more suitably joined portions. An example of this is shown in Fig. 2, where the interlocking flange, 3, is formed by a separate ring set into the swaged groove of the rim and brazed or otherwise fastened to the narrow, outwardly turned edge of the rim. When equipping wheels with rims of the form shown in Fig. 3, I preferably provide a small wire ring or hoop, 6, to be placed between the felly and the inside edge of the detachable flange to hold the latter in engagement with the rim. The hoop, 6, is held in place by its own resiliency. Its use is of a precautionary character. The manner of removing a tire from a rim and then replacing it thereon is as follows: It is assumed that the tire is in an expanded condition and that the detachable flange or ring is in its normal interlocked position on the rim. To remove the tire it is first necessary to deflate the same and push the side of the tire inwardly—that is, across the face of the rim and out of engagement with the ring, 4. Starting at the opening or cut, 4ª, in the ring, the latter is then pushed inwardly on the rim until its flange, 5, is freed from the flange, 3, on the rim, then, by pulling outwardly on the ends of the ring, the ring may be quickly stripped off the rim. The ring having been removed, the tire may be pulled off the rim with ease, there being no obstructions on the latter when formed as herein shown. In replacing the tire the first operation consists in slipping the tire onto the rim; as it is then deflated, its side may be readily forced in to make room for the flange ring. The ring is then slightly opened or closed, according as it is constructed as in Fig. 2 or as in Fig. 3, and it is pushed over the rim until its flange drops into engagement with the locking flange on the rim. The flanges need be only partly interlocked at this time and the inflation of the tire may begin at once, the expansion of the latter being depended upon to force the ring or split flange into firm, interlocked engagement with the rim.

Various modifications of my separable rim and flange will readily suggest themselves to one skilled in the art and I therefore do not confine my invention to the specific constructions herein shown and described.

Having thus described my invention, I claim as new and desire to secure by Letters Patent:

1. A wheel rim having a fixed tire retaining flange on one of its edges and having its other edge bent inwardly, thence laterally toward the main body of the rim to form a groove, the inner and outer surfaces of which are parallel with each other, in combination with a detachable sheet metal flange comprising a split ring having a tire retaining flange portion, its inner edge being bent over away from the body of the rim to form an annular groove and a laterally projecting edge conformed to and adapted to fit the bent edge and groove of the rim and to interlock therewith, substantially as described.

2. A pneumatic tire-holding and retaining device comprising a continuous rim having a tire-receiving periphery of substantially the width of the base of the tire and having a fixed integral tire-retaining flange at one edge and having its other edge bent in L-shaped cross-section, to form a parallel sided groove, the extreme edge thereof being bent laterally toward the main body of the rim to form a continuous overhanging shoulder, and a combined integral tire-retaining flange and locking ring split at one point and having a similar but oppositely formed L-shaped inner portion and a corresponding parallel sided groove adapting the rim and ring to mutually interlock, the shoulders thereof acting to prevent radial separation of the rim and ring.

In testimony whereof, I have hereunto set my hand, this 7th day of October, 1905, in the presence of two subscribing witnesses.

ERLE K. BAKER.

Witnesses:
CHARLES GILBERT HAWLEY,
CHARLES T. MURRAY.